Figure 1:
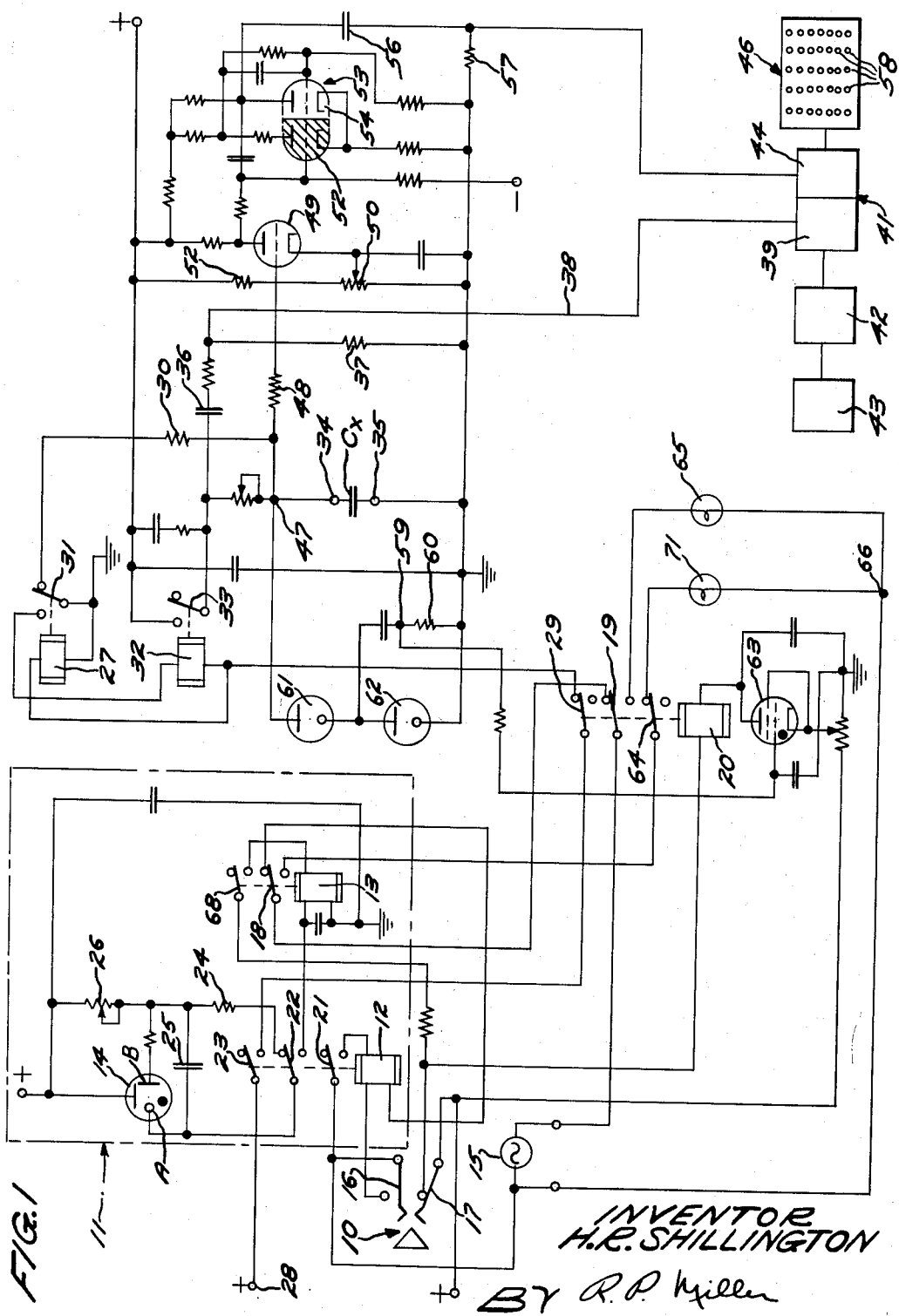

July 3, 1962

H. R. SHILLINGTON 3,042,860

CAPACITANCE MEASURING AND DIELECTRIC STRENGTH TEST SET

Filed Jan. 26, 1959

2 Sheets-Sheet 1

INVENTOR
H.R. SHILLINGTON
BY R.P. Miller
ATTORNEY

United States Patent Office 3,042,860
Patented July 3, 1962

3,042,860
CAPACITANCE MEASURING AND DIELECTRIC STRENGTH TEST SET
Harry R. Shillington, Glen Ellyn, Ill., assignor to Western Electric Company, Incorporated, New York, N.Y., a corporation of New York
Filed Jan. 26, 1959, Ser. No. 789,131
5 Claims. (Cl. 324—60)

This invention relates to a capacitance measuring and dielectric strength test set and more particularly to a test set for simultaneously measuring the time required to accumulate a predetermined charge on a capacitor while subjecting the capacitor to a dielectric strength test for a predetermined increment of time.

In the manufacture of capacitors, it is necessary to determine capacitance values within finite limits and also whether the capacitor will withstand the application of a predetermined breakdown voltage. Where mass production methods are employed, it is necessary to perform these tests with a minimum expenditure of time. It is a further requisite that the test facilities be simple to operate thereby enabling the employment of non-technical personnel. This can only be accomplished by avoiding test circuits that require individual adjustments for each test performed. It is thus apparent that bridge circuits requiring adjustments are not readily adapted for mass production testing. Further, it is necessary that the test facilities provide simple visual indicating means to apprise the attendant tester that a satisfactory test has been completed.

It is a primary object of the present invention to provide a relatively simple, accurate and economical test set for simultaneously measuring the capacitance of a capacitor while subjecting the capacitor to a dielectric strength test.

Another object of the invention resides in a test set for continuously applying charging potential to a capacitor and making a plurality of different characteristic tests.

An additional object of the invention is the provision of a capacitor test set having time-controlled elements for operating a relay-type switching circuit to control the periods during which a capacitor is simultaneously subjected to a plurality of tests.

A further and more finite object of this invention is the provision of an electronic counter circuit for ascertaining capacitance values that is initiated by the application of a charging potential to a capacitor and stopped by the acquisition of a predetermined charge on the capacitor together with electronic instrumentalities that automatically provide for the completion of a dielectric strength test which has simultaneously been taking place.

With these and other objects in view, the present invention contemplates a test set for simultaneously ascertaining the capacitance and dielectric strength characteristics of a capacitor. At the instant of initiation of a capacitance test, an electronic decade counter is initiated into operation, and upon accumulation of a predetermined charge on the capacitor, facilities are rendered effective to generate and apply a stop pulse to the counter. Associated with each stage of the counter is a visual indicating means. Inasmuch as capacitance is known to be a function of the time required to accumulate a charge on a capacitor through a resistor connected in series with the capacitor, the actuated stages of the counter are indicative of the capacitance value of the capacitor. The indicating means associated with the operated stages will be illuminated; consequently, apprising the attendant tester of the capacitance value.

During the capacitance-measuring test, the capacitor is simultaneously undergoing a dielectric strength test which continues after the counter has stopped counting and a D.C. voltage of a preconcerted magnitude continues to be applied to the capacitor for a predetermined increment of time. If the capacitor cannot withstand the applied voltage, an electronic means is rendered effective and a current is caused to flow which operates a lamp to inform the attendant tester that the capacitor is defective.

Figure 2:
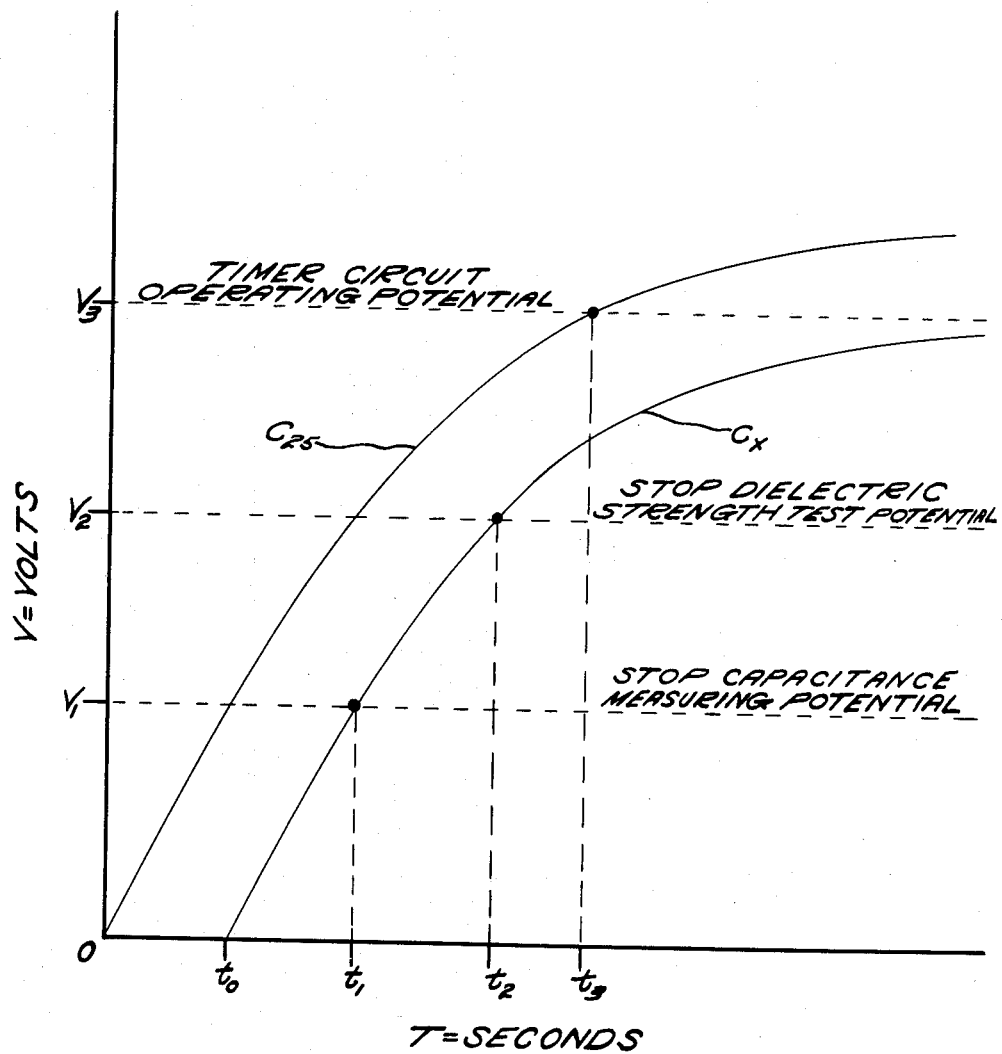

Other objects and advantages of the present invention will be apparent from the following detailed description when considered in conjunction with the accompanying drawing wherein:

FIG. 1 is a diagrammatic view of a capacitance measuring and dielectric strength test set circuit embodying the principles of the present invention; and FIG. 2 is a graph depicting the rate of charge on a capacitor under test and on a timing capacitor during a cycle of operation of the test set.

Referring to the drawing, there is disclosed a switch 10 which when closed, initiates the operation of an overall timer-control circuit generally designated by the numeral 11. The timer circuit includes, among other things, relays 12 and 13 and a double-gap, gas-filled, cold-cathode tube 14. Energizing current for the relay 12 is provided by the source 15 and flows from the source through a contact 16 of the switch 10, the relay 12, a contact 18 of the relay 13 and a contact 19 of a relay 20 back to the source 15. The energization of relay 12 draws up contacts 21, 22 and 23. Closure of contact 21 provides a locking circuit for the relay 12 which may be traced from the source through the contact 21, the relay 12 and the contacts 18 and 19. Closure of contact 22 removes a resistor 24 from across a capacitor 25 thereby permitting the capacitor 25 to charge through a resistor 26. The magnitudes of the resistor 26 and the capacitor 25 are chosen to provide a desired time interval before the tube 14 will fire. When the capacitor 25 has been charged to a sufficient voltage, the voltage differential between pins A and B of the tube 14 will be such that the tube will fire and the energization of the relay 13 will result. However, the length of time required for the firing of the tube 14 is such that if the remainder of the circuit functions satisfactorily, this operation will not be performed.

Closure of contact 23 completes a circuit which is utilized to energize the relay 27. Energizing current for the relay 27 flows from a source of potential 28 through the contact 23, a contact 29 of the relay 20 and the relay 27 to ground. The energization of the relay 27 draws up a contact 31 thereby completing a similar path to ground from the positive source of potential 28 to energize a relay 32. The energization of the relay 32 draws up a contact 33 and initiates the testing operation.

The closure of contact 33 provides a charging voltage from a source of positive battery to a capacitor $C_x$ which is manually or automatically positioned between contacts 34 and 35. At the same time, voltage is applied from the positive source to a differentiating circuit consisting of a capacitor 36 and a resistor 37. The voltage wave applied to this circuit is differentiated to produce a positive-going pulse that is applied over a lead 38 to one section 39 of a gating circuit generally designated by the reference numeral 41. The gating circuit is connected through a pulse-shaping device 42 to a free-running oscillator 43. The gating circuit may be of any of several well-known types that is opened upon the application of a pulse to one section 39 thereof and closed by the application of another pulse to a section 44. The application of the pulse to the section 39 opens the circuit to permit the oscillator output to be impressed through the wave-shaping circuit 42 and the gating circuit 41 to drive a multi-stage decade counter 46.

Charging voltage that is provided for the capacitor under test $C_x$ builds up thereby raising the potential at a junction point 47. This junction point is connected through a resistance 48 to the grid of an amplifier tube 49. Initial bias is placed on the cathode of the amplifier 49 by means of an adjustable potentiometer 50 which is connected through a resistor 57 to the source of positive battery. After a relatively short interval of time, the potential at junction point 47 rises to such an extent that the grid potential of the tube 49 is such to permit conduction of the tube. Immediately thereupon, the anode potential of this tube drops to impress a decreased potential condition on the grid of a left-hand triode 52 of a one-shot multi-vibrator generally designated by the reference numeral 53. Circuit parameters are selected for the multi-vibrator 53 so that the left-hand triode 52 is normally conducting and a right-hand triode 54 is maintained in a state of non-conduction. When the decreased potential condition is impressed on the grid of the left-hand triode 52, this triode assumes a non-conducting condition and a differentiated positive pulse is impressed through a coupling circuit to the grid of the right-hand triode thus placing this triode in a state of conduction. The anode potential of triode 54 drops to impress a decreased potential condition through a differentiating circuit consisting of a capacitor 56 and a resistance 57 to the right-hand section 44 of the gating circuit 41. This action causes the gating circuit to preclude further application of output pulses from the oscillator 43 to the multi-stage decade counter 46. The counter now stops and lamps 58 in each decade are illuminated and are indicative of the time that the counter has been operating.

If a standard capacitor is inserted between terminal contacts 34 and 35 and an adjustment is made of the potentiometer resistor 50, then it is possible to have lamps illuminated in each decade of the counter that are representative of the capacitance value of the standard capacitor. Now when a capacitor of unknown capacitance value is placed between the terminal contactors 34 and 35 and if this capacitor has the same capacitance value as that of the standard capacitor, then the same lamps will be illuminated in each decade of the counter 46. However, if other than these lamps are illuminated, then the attendant tester will be apprised of the fact that the capacitor under test has a capacitance value other than that of the standard capacitor. If this reading is much different from the established limits obtained with the use of the standard capacitor in the circuit, then the attendant tester will realize that the capacitor is defective.

If the capacitor has a capacitance value other than that of the standard capacitor, the illuminated lights in the several decades give a direct reading of the actual capacitance value. It is thus apparent that this section of the circuit is to be utilized to obtain direct readings of unknown capacitance values. This entire capacitance-measuring network is of the general type shown in the co-pending applications of H. R. Shillington, Serial Nos. 645,689 and 645,778, both filed March 13, 1957. The last-mentioned application is now U.S. Patent 2,929,021, issued on March 15, 1960.

The charge voltage on the capacitor $C_x$ will continue to rise even after the capacitance test has been completed and the counter has stopped counting. When the charge on this capacitor has reached a predetermined voltage, a pair of voltage regulator tubes 61 and 62 will be triggered and the conduction of the tube 62 will cause a rise in potential at a junction point 59 due to the current flow through and the drop in potential across a resistor 60. This rise in potential, which exceeds a critical grid potential, is applied to trigger the thyratron 63 into conduction. The triggering of the thyratron results in the energization of the relay 20 and the drawing up of contacts 64, 19 and 29. The closure of contact 19 provides a path for current to an accept lamp 65. The path for illuminating current to the lamp 65 may be traced directly from the source 15 through the contact 19 and the lamp 65 to a pin 66 connected to the other side of the source. The closure of contact 19 further provides for the resetting of the entire timing circuit by opening the locking circuit to the energized relay 12. The closure of contact 29 results in the deenergization of relays 27 and 32 and provides the capacitor $C_x$ with a discharge path to ground through a resistor 30 and the now released contact 31 of the relay 27. The closure of contact 29 further provides for the removal of the high-voltage charging circuit to the capacitor $C_x$ which was formerly on test. The relay 20 may further be utilized to operate circuitry that will automatically accept a product which has satisfactorily passed the foregoing tests.

Should the capacitor $C_x$ fail the required dielectric strength test and break down as the voltage continues to rise, the voltage regulator tubes 61 and 62 will not trigger. Furthermore, neither the thyratron 63 nor the relay 20 will be rendered effective and the timer circuit will complete a cycle of operation. The predetermined time having run out and the charge on the capacitor 25 having reached a sufficient magnitude to trigger the tube 14, the energization of the relay 13 will result thereby drawing up contacts 18 and 68. The closure of contact 18 opens the locking circuit of the relay 12 and provides a path for current from the source 15 through a contact 19 of the relay 20, the contact 18 and the contact 64 of the relay 20 to a reject lamp 71. The energization of the relay 13, the closure of contacts 18 and 68, the subsequent deenergization of the relay 12, and the opening of contact 23 further results in the deenergization of the relays 27 and 32 thereby providing a discharge path for the capacitor $C_x$ and the opening of the high-voltage charging circuit.

Mode of Operation

The operation of the capacitance measuring and dielectric strength test set may best be appreciated when considered in conjunction with FIGS. 1 and 2. Depression of the starting switch 10 results in the energization of the relay 12 and the drawing up of contacts 21, 22 and 23. Immediately thereafter, voltage is applied to the capacitor 25 from a source of positive battery through the resistor 26. The potential on the capacitor 25 builds up in a manner depicted by the curve $C_{25}$ illustrated in FIG. 2.

The energization of relay 12 further results in the actuation of the relays 27 and 32 and, subsequently, in the application of a charging potential to the capacitor under test $C_x$. As the charging potential is initially applied to the capacitor $C_x$, a start pulse will simultaneously be provided to initiate the operation of the electronic decade counter 46. Considering the charging of the capacitor 25 to have begun at zero time reference, the instant when the charging of the capacitor $C_x$ is initiated will be described as $T_0$.

Referring now to FIG. 2 and more particularly to the curve depicting the build up of voltage on the capacitor $C_x$, there are shown values $V_1$ and $V_2$ which will be attained at times $T_1$ and $T_2$ if, of course, the capacitor does not break down. When the potential build up has reached $V_1$ at time $T_1$, the bias on the amplifier 49 will be such as to send the tube into conduction. As previously described, the decreased anode potential of the conducting amplifier will serve to cut off the left-hand triode 52 of the multivibrator 53 and place the right-hand triode 54 in a state of conduction. The drop in anode potential of the triode 54 will be impressed through the differentiating circuit comprising the capacitor 56 and the resistor 57 to preclude the counter from further operation. The indication given by illuminated lamps 58 of the decade counter will be a direct reading of the capacitance value of the capacitor $C_x$ which is undergoing the test.

The operation of the counter circuit having been precluded and the measuring operation having been completed, the charge on the capacitor will continue to rise until it has reached a potential $V_2$ at time $T_2$. The magnitude of the charge $V_2$ is sufficient to trigger the voltage regulator tubes 61 and 62 and thereby fire the thyratron 63. The firing of thyratron 63 will result in the energization of the relay 20 and the drawing up of contacts 19, 29, and 64. The closure of these contacts will render instrumentalities effective which will reset the timer, render the accept lamp 65 effective, provide a discharge path for the capacitor $C_x$ and condition the circuit for a subsequent test operation.

Should the capacitor permanently break down and fail the dielectric strength test after the measuring operation has satisfactorily been completed, the charge on the capacitor 25 will be permitted to rise to a magnitude $V_3$ at time $T_3$ and will result in the firing of the double-gap gas-filled tube 14. The firing of the tube 14 will result in the energization of the relay 13 and subsequently in the illumination of a reject lamp 71 as well as the various other operations which are necessary for conditioning the circuit for a subsequent test operation. If the capacitor $C_x$ breaks down prior to the completion of the capacitance-measuring operation, the foregoing sequence of events will occur accompanied by the continued operation of the counter 46 which will then have to be reset manually.

It is to be understood that the above-described arrangements are simply illustrative of the application of this invention. Numerous other arrangements may be readily devised by those skilled in the art which will embody the principles of the invention and fall within the spirit and scope thereof.

What is claimed is:

1. A capacitor-testing apparatus, which comprises means for applying charging potential to a capacitor to be tested, means responsive to an accumulation of a first predetermined charge for measuring the capacitance of the capacitor, a timer initiated into operation upon application of said charging potential to said capacitor, means responsive to the timer operating for a predetermined time to interrupt the application of said charging potential to said capacitor, and means actuated by the further accumulation of a charge on said capacitor to a second predetermined level for interrupting operation of the timer and the application of charging potential to said capacitor.

2. A test set for ascertaining dielectric strength characteristics of a capacitor comprising means for applying break-down potential to the capacitor to be tested, a timer initiated into operation upon application of said break-down potential to said capacitor, means responsive to the satisfactory accumulation of a predetermined charge on said capacitor without break down for interrupting application of said potential and the operation of said timer, and relay means connected to said timer and energized upon operation of said timer for a predetermined time to preclude application of said potential to said capacitor.

3. A test set for simultaneously ascertaining capacitance and dielectric strength characteristics of a capacitor, which comprises a power-supply means, a timer circuit including a relay means, a starting switch for connecting said power-supply means to said timer circuit to energize said relay means and thereby initiate operation of said timer circuit, a source of potential, means responsive to the energization of said relay means for applying said potential to a capacitor under test, a time-measuring counter, means actuated by said voltage-applying means for initiating operation of said counter, means responsive to the accumulation of a first predetermined charge on said capacitor for stopping said counter, means rendered effective upon the further accumulation of a charge on said capacitor under test to a second predetermined level without breakdown for interrupting application of said potential to said capacitor and for resetting said timer circuit, and means connected to said timer circuit and responsive to the operation of the timer for a predetermined time, indicative of capacitor breakdown, for interrupting application of said potential to said capacitor.

4. An apparatus for simultaneously measuring capacitance of a capacitor while subjecting the capacitor to a dielectric strength test, which comprises power-supply means, a timer circuit, a starting switch connected to said power-supply means for initiating a cycle of operation of said timer circuit, a source of D.C. potential, relay means energized by said starting switch and the initiation of said timer circuit into a cycle of operation for applying said D.C. potential to said capacitor, an electronic multi-stage decade counter having indicating means associated with each stage in each decade, means actuated by said voltage-applying means for initiating operation of said counter, a pulse-generating control circuit operated by the accumulation of a first predetermined charge on the capacitor for generating a pulse to stop the counter whereby the operated indicating means represents the time required to accumulate said first predetermined charge, means for adjusting the pulse-producing circuit to produce the pulse which stops the counter at a time that is indicative of the capacitance, means for indicating voltage break down, means operated by a voltage break down across said capacitor for operating said voltage break-down indicating means, a discharge resistor circuit, and means responsive to the further accumulation of a charge on said capacitor to a second predetermined level for disconnecting said D.C. potential and connecting said discharge resistor circuit to said capacitor.

5. A circuit for simultaneously accomplishing capacitance measuring and dielectric strength tests on capacitors, which comprises a source of testing potential, relay means, a counter for recording the capacitance value of a capacitor under test, a timer circuit, means for concomitantly rendering said timer circuit and said relay means operable, means responsive to the operation of said relay means for simultaneously initiating operation of said counter and for applying said testing potential to a capacitor under test, pulse generating means, means for actuating said pulse generating means upon the accumulation of a first predetermined charge on the capacitor under test to generate a stop pulse and terminate the operation of said counter, means rendered effective upon the further accumulation of a charge on said capacitor under test to a second predetermined level without breakdown for interrupting application of said testing potential to said capacitor and for terminating operation of said timer circuit, and means connected to said timer circuit and responsive to the operation of the timer for a predetermined time, indicative of capacitor breakdown, for interrupting application of said testing potential to said capacitor.

References Cited in the file of this patent
UNITED STATES PATENTS

| | | |
|---|---|---|
| 2,436,872 | Smith | Mar. 2, 1948 |
| 2,455,543 | Williams | Dec. 7, 1948 |
| 2,589,070 | Frisbie et al. | Mar. 11, 1952 |
| 2,601,491 | Baker | June 24, 1952 |